(12) United States Patent
Ee et al.

(10) Patent No.: US 11,715,490 B2
(45) Date of Patent: Aug. 1, 2023

(54) HARD DISK DRIVE GIMBAL DESIGN WITH HIGH TORSION FREQUENCIES

(71) Applicant: Magnecomp Corporation, Murrieta, CA (US)

(72) Inventors: Kuen Chee Ee, Chino, CA (US); Ekaratch Pankaew, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/703,827

(22) Filed: Mar. 24, 2022

(65) Prior Publication Data

US 2022/0310116 A1 Sep. 29, 2022

Related U.S. Application Data

(60) Provisional application No. 63/166,415, filed on Mar. 26, 2021.

(51) Int. Cl.
*G11B 5/48* (2006.01)

(52) U.S. Cl.
CPC .......... *G11B 5/4826* (2013.01); *G11B 5/4833* (2013.01)

(58) Field of Classification Search
CPC .............................. G11B 5/4826; G11B 5/4833
See application file for complete search history.

(56) References Cited

U.S. PATENT DOCUMENTS

| | | | |
|---|---|---|---|
| 6,011,671 A | 1/2000 | Masse et al. | |
| 6,515,832 B1 * | 2/2003 | Girard | G11B 5/4826 |
| 7,567,410 B1 * | 7/2009 | Zhang | G11B 5/4853 |
| | | | 360/245.9 |
| 7,898,772 B1 * | 3/2011 | Ziaei | G11B 5/4826 |
| | | | 360/245 |
| 8,085,506 B1 * | 12/2011 | Ee | G11B 5/486 |
| | | | 360/245.9 |
| 8,089,731 B1 * | 1/2012 | Ma | G11B 5/4853 |
| | | | 360/245.2 |
| 8,130,470 B2 | 3/2012 | Muraki et al. | |
| 8,208,224 B1 * | 6/2012 | Teo | G11B 5/4826 |
| | | | 360/245.3 |
| 8,310,790 B1 * | 11/2012 | Fanslau, Jr. | G11B 5/483 |
| | | | 360/294.4 |

(Continued)

OTHER PUBLICATIONS

International Search Report and Written Opinion in International Application No. PCT/US2022/016859, dated Jun. 10, 2022.

(Continued)

*Primary Examiner* — Brian E Miller
(74) *Attorney, Agent, or Firm* — DLA Piper LLP (US)

(57) ABSTRACT

A trace gimbal is described herein. In some embodiments, the trace gimbal includes outer struts including a front outrigger at a distal end of the trace gimbal and a rear outrigger at a proximal end of the trace gimbal. The front outrigger includes a distal front outrigger and a proximal front outrigger, and the rear outrigger includes a distal rear outrigger and a proximal rear outrigger. The trace gimbal further includes a middle strut extending in a width direction of the trace gimbal and adjoining the proximal front outrigger to the rear outrigger, and an inner strut connecting the middle strut to a slider tongue. The inner strut and the middle strut adjoin the outer gimbal struts to the slider tongue.

20 Claims, 2 Drawing Sheets

(56) References Cited

U.S. PATENT DOCUMENTS

| | | | |
|---|---|---|---|
| 8,441,761 B1* | 5/2013 | Hahn | G11B 5/4833 360/245.9 |
| 8,446,695 B1 | 5/2013 | Ee et al. | |
| 8,792,212 B1* | 7/2014 | Pan | G11B 5/4826 360/245.9 |
| 8,792,213 B1* | 7/2014 | Vijay | G11B 5/4833 360/245.3 |
| 8,879,210 B1 | 11/2014 | Hahn et al. | |
| 8,947,831 B1 | 2/2015 | Ee et al. | |
| 8,964,334 B2 | 2/2015 | Takikawa et al. | |
| 8,976,491 B1 | 3/2015 | Chen et al. | |
| 9,190,086 B1 | 11/2015 | Ee et al. | |
| 9,558,768 B1 | 1/2017 | Tsuchiya et al. | |
| 10,783,909 B1 | 9/2020 | Tiller et al. | |
| 11,043,236 B1* | 6/2021 | Pallay | G11B 5/4833 |
| 11,176,961 B2* | 11/2021 | Suzuki | G11B 5/4846 |
| 11,289,120 B1* | 3/2022 | Pallay | G11B 5/4826 |
| 2007/0223143 A1* | 9/2007 | Matsui | G11B 5/486 360/245.1 |
| 2008/0144223 A1 | 6/2008 | Muraki et al. | |
| 2010/0238581 A1* | 9/2010 | Nakamura | G11B 5/4853 |
| 2011/0096438 A1 | 4/2011 | Takada et al. | |
| 2014/0022670 A1 | 1/2014 | Takikawa et al. | |
| 2014/0022671 A1* | 1/2014 | Takikawa | G11B 5/4826 360/234.6 |
| 2014/0022674 A1* | 1/2014 | Takikawa | G11B 5/483 360/244.5 |
| 2014/0085755 A1 | 3/2014 | Hanya et al. | |
| 2015/0055253 A1* | 2/2015 | Takikawa | G11B 5/4826 360/246.2 |
| 2018/0144767 A1 | 5/2018 | Ee | |
| 2018/0286457 A1* | 10/2018 | Teramoto | G11B 5/483 |
| 2019/0066720 A1* | 2/2019 | Yamada | G11B 5/4833 |
| 2020/0265866 A1* | 8/2020 | Suzuki | G11B 5/484 |
| 2020/0279579 A1* | 9/2020 | Nakayama | G11B 5/4826 |
| 2021/0151073 A1* | 5/2021 | Yamada | G11B 5/4826 |
| 2021/0225394 A1 | 7/2021 | Suzuki et al. | |
| 2021/0241791 A1 | 8/2021 | Pankaew et al. | |
| 2021/0241802 A1* | 8/2021 | Nakayama | G11B 25/043 |
| 2021/0280209 A1* | 9/2021 | Suzuki | G11B 5/4846 |
| 2021/0287698 A1* | 9/2021 | Yamada | G11B 5/5582 |
| 2022/0122633 A1* | 4/2022 | Zhang | G11B 5/4826 |
| 2022/0262395 A1* | 8/2022 | Glaess | G11B 5/4833 |
| 2022/0310116 A1* | 9/2022 | Ee | G11B 5/4826 |

OTHER PUBLICATIONS

International Search Report and Written Opinion in International Application No. PCT/US2022/022056, dated Jun. 7, 2022.
International Search Report and Written Opinion in International Application No. PCT/US2021/055690, dated Jan. 28, 2022.
Office Action in U.S. Appl. No. 17/504,187, dated Apr. 26, 2022.
Office Action in U.S. Appl. No. 17/673,683, dated Aug. 16, 2022.
Office Action in U.S. Appl. No. 17/504,187, dated Oct. 5, 2022.
Notice of Allowance in U.S. Appl. No. 17/673,683, dated Feb. 13, 2023.

* cited by examiner

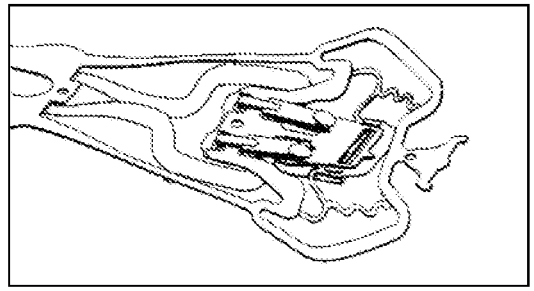
FIG. 3A First gimbal torsion
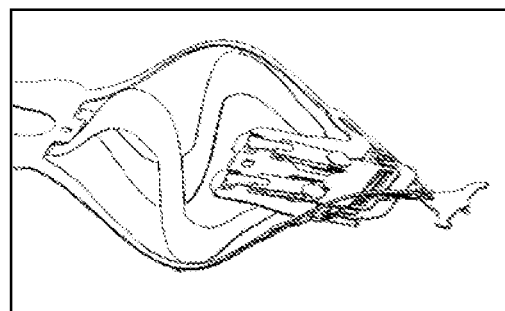
FIG. 3B Second gimbal torsion
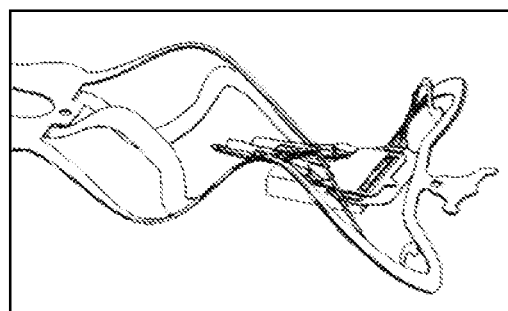
FIG. 3C Third gimbal torsion

HARD DISK DRIVE GIMBAL DESIGN WITH HIGH TORSION FREQUENCIES

CROSS-REFERENCE TO RELATED APPLICATIONS

This application claims the benefit of, and priority to, U.S. Provisional Application No. 63/166,415 filed on Mar. 26, 2021, which is hereby incorporated by reference in its entirety. This application is also related to U.S. patent application Ser. No. 17/673,683 filed on Feb. 16, 2022, which claims priority to U.S. Provisional Patent Application No. 63/150,484 filed on Feb. 14, 2021, the entire disclosures of which are hereby incorporated by reference

FIELD

This disclosure relates to the field of suspensions for hard disk drives. More particularly, this disclosure relates to the field of gimbal assemblies for a suspension.

BACKGROUND

In a disk storage device, a rotating disk is employed to store information. Disk storage devices typically include a frame to provide attachment points and orientation for other components, and a spindle motor mounted to the frame for rotating the disk. A head slider includes a read/write head for writing and reading data to and from the disk surface. The head slider is supported and properly oriented in relationship to the disk by a suspension that provides both the force and compliance necessary for proper head slider operation. As the disk in the storage device rotates beneath the head slider and head suspension, the air above the disk also rotates, thus creating an air bearing which acts with an aerodynamic design of the suspension to create a lift force. The lift force is counteracted by a spring force of the suspension, thus positioning the head slider at a desired height and alignment above the disk which is referred to as the fly height.

Suspensions for disk drives include a load beam and a flexure. The load beam typically includes a mounting region for mounting the suspension to an actuator of the disk drive, a rigid region, and a spring region between the mounting region and the rigid region. The spring region provides a spring force to counteract the aerodynamic lift force generated on the suspension during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of a another or secondary actuator or actuators, such as a piezoelectric, electrostatic or electromagnetic actuator or fine tracking motor, mounted on the head suspension itself. These types of actuators are also known as microactuation devices and may be located at the base plate, the load beam or on the flexure. Some of these attempts to improve tracking and head slider positioning control have included locating the actuators both at the base plate and on the flexure tongue simultaneously. Typically, this type of suspension uses voice coil and the actuator located at the base plate region for a large motion of the read/write head, while uses the actuator located on the flexure tongue for a desired fine movement to position the read/write head over the tracks of the disk drive.

SUMMARY

A trace gimbal is described herein. According to some embodiments of the present disclosure, the trace gimbal includes outer struts including a front outrigger at a distal end of the trace gimbal and a rear outrigger at a proximal end of the trace gimbal. The front outrigger includes a distal front outrigger and a proximal front outrigger, and the rear outrigger includes a distal rear outrigger and a proximal rear outrigger. The trace gimbal further includes a middle strut extending in a width direction of the trace gimbal and adjoining the proximal front outrigger to the rear outrigger, and an inner strut connecting the middle strut to a slider tongue. The inner strut and the middle strut adjoin the outer gimbal struts to the slider tongue.

According to some embodiments of the present disclosure, the trace gimbal further comprises at least one microactuator mounted on the slider tongue, wherein the inner strut supports the slider tongue.

According to some embodiments of the present disclosure, the proximal front outrigger includes a first cross-section and distal front outrigger includes a second cross-section, wherein a width of the second cross-section width is about a same dimension as the first cross-section of the proximal front outrigger.

According to some embodiments of the present disclosure, the first cross-section and the second cross-section of the front outrigger is between 0.05 millimeters ("mm") and 0.10 mm.

According to some embodiments of the present disclosure, the distal rear outrigger includes a first cross-section and the proximal rear outrigger includes a second cross-section larger than the first cross-section.

According to some embodiments of the present disclosure, the first cross-section of the distal rear outrigger is between 0.10 mm and 0.20 mm.

According to some embodiments of the present disclosure, the inner strut includes a distal end and a proximal end, a distal end of the middle strut connects to the distal end of the inner strut, and the proximal end of the inner strut connects to the slider tongue.

According to some embodiments of the present disclosure, the inner strut generally extends from the distal end of the middle strut toward a proximal end of the trace gimbal to connect to the slider tongue.

According to some embodiments of the present disclosure, the front outrigger and the middle strut generally form a C-shape or U-shape.

According to some embodiments of the present disclosure, a cross section of the middle strut is about the same as the first and second cross-sections of the front outrigger.

A suspension comprising the trace gimbal according to some embodiments of the present disclosure is also provided.

According to some embodiments of the present disclosure, the trace gimbal further comprises at least one microactuator mounted on the slider tongue, wherein the inner strut supports the slider tongue.

According to some embodiments of the present disclosure, the proximal front outrigger includes a first cross-section and distal front outrigger includes a second cross-section, wherein a width of the second cross-section width is about a same dimension as the first cross-section of the proximal front outrigger.

According to some embodiments of the present disclosure, the first cross-section and the second cross-section of the front outrigger is between 0.01 mm and 0.10 mm.

According to some embodiments of the present disclosure, the distal rear outrigger includes a first cross-section and the proximal rear outrigger includes a second cross-section larger than the first cross-section.

According to some embodiments of the present disclosure, the first cross-section of the distal rear outrigger is between 0.01 mm and 0.10 mm.

According to some embodiments of the present disclosure, the inner strut includes a distal end and a proximal end, a distal end of the middle strut connects to the distal end of the inner strut, and the proximal end of the inner strut connects to the slider tongue.

According to some embodiments of the present disclosure, the inner strut generally extends from the distal end of the middle strut toward a proximal end of the trace gimbal to connect to the slider tongue.

According to some embodiments of the present disclosure, the front outrigger and the middle strut generally form a C-shape or U-shape.

According to some embodiments of the present disclosure, a cross section of the middle strut is about the same as the first and second cross-sections of the front outrigger.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

FIG. 3A illustrates a perspective view of an exemplary mode shape of a first gimbal torsion according to some embodiments of the present disclosure. FIG. 3B illustrates a perspective view of an exemplary mode shape of a second gimbal torsion according to some embodiments of the present disclosure. FIG. 3C illustrates a perspective view of an exemplary mode shape of a third gimbal torsion according to some embodiments of the present disclosure.

DETAILED DESCRIPTION

Figures 1, 2:
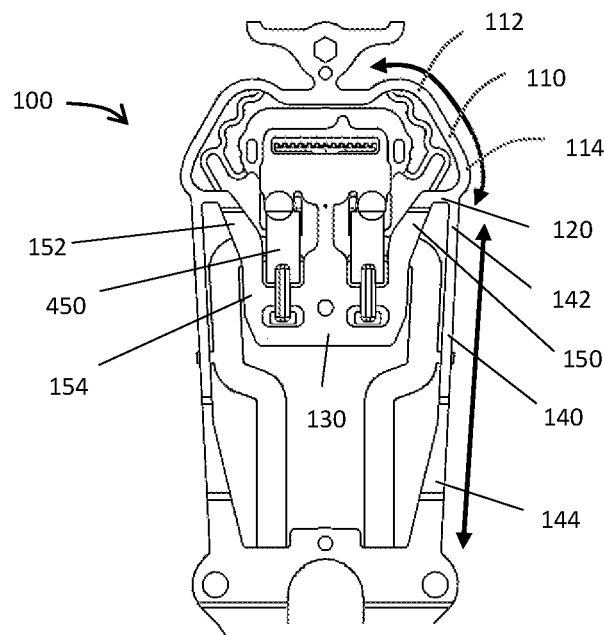
FIG. 1 illustrates a gimbal assembly of a suspension according to some embodiments of the present disclosure.
FIG. 2 illustrates roll stiffness and torsional frequencies of a gimbal according to some embodiments of the present disclosure.

An improved trace gimbal is described herein. The improved trace gimbal according to some embodiments of the present disclosure is part of suspension for a magnetic or optical disk drive unit. The disk drive unit includes a spinning magnetic or optical disk, which contains a pattern of magnetic ones and zeroes on it that constitutes the data stored on the disk drive. The disk is driven by a drive motor. The disk drive unit, according to some embodiments, includes a suspension with a load beam, a base plate, and a trace gimbal to which a head slider is mounted proximate the distal end of the trace gimbal. The proximal end of a suspension or load beam is the end that is supported, i.e., the end nearest to a base plate which is swaged or otherwise mounted to an actuator arm. The distal end of a suspension or load beam is the end that is opposite the proximal end, i.e., the distal end is the cantilevered end.

The trace gimbal is coupled to a base plate, which in turn is coupled to a voice coil motor. The voice coil motor is configured to move the suspension arcuately in order to position the head slider over the correct data track on the magnetic disk. The head slider is carried on a gimbal, which allows the slider to pitch and roll so that it follows the proper data track on the spinning disk, allowing for such variations without degraded performance. Such variations typically include vibrations of the disk, inertial events such as bumping, and irregularities in the disk's surface.

In some embodiments, the trace gimbal described herein is part of a dual stage actuation (DSA), tri-stage, or other type of actuated suspension. The suspension can include a base plate and a load beam. The load beam includes a trace gimbal. The trace gimbal can include mounted actuators and a gimbal assembly. The actuators are operable to act directly on the gimbaled assembly of the suspension that is configured to include the read/write head slider.

In some embodiments, the trace gimbal can include at least one actuator joint configured to receive an actuator. The trace gimbal, according to some embodiments, includes two actuator joints, located on opposing sides of the trace gimbal. Each actuator joint includes actuator mounting shelves.

In some embodiments, each actuator spans the respective gap in the actuator joint. The actuators are affixed to the slider tongue by an adhesive. The adhesive can include conductive or non-conductive epoxy strategically applied at each end of the actuators. The positive and negative electrical connections can be made from the actuators to the trace gimbal by a variety of techniques. When the actuator is activated, it expands or contracts producing movements of the read/write head that is mounted at the distal end of suspension thereby changing the length of the gap between the mounting ends.

In some embodiments, the suspension can be configured as a single-stage actuation suspension, a dual-stage actuation device, a tri-stage actuation device or other configurations. In some embodiments, the tri-stage actuation suspension includes actuators respectively located at the mount plate region and on the trace gimbal at the same time. Conceivably, any variation of actuators can be incorporated onto the suspension for the purposes of the examples disclosed herein. In other words, the suspension may include more or less components than those shown without departing from the scope of the present disclosure. The components shown, however, are sufficient to disclose an illustrative example for practicing the disclosed principles.

FIG. 1 illustrates a trace gimbal 100, according to some embodiments of the present disclosure. The trace gimbal 100 includes at least one microactuator 450 mounted on a slider tongue 130. The trace gimbal 100 includes outer gimbal struts. The outer gimbal struts include a front outrigger 110 at a distal end of the trace gimbal 100. In some embodiments, the front outrigger includes a proximal front outrigger 114 and a distal front outrigger 112. In some embodiments, the distal front outrigger 112 and the proximal front outrigger 114 are defined by a bend or non-linear feature of the front outrigger 110. In some embodiments, the distal front outrigger 112 and the proximal front outrigger 114 are non-distinguishable, and may be adjoined at a linear feature that does not physically separate the two features.

In some embodiments, the proximal front outrigger 114 includes a first cross-section and distal front outrigger 112 includes a second cross-section, wherein a width of the second cross-section width is about a same dimension as the first cross-section of the proximal front outrigger. In some embodiments, the first cross-section and the second cross-section of the front outrigger is between 0.01 mm and 0.10 mm.

In some embodiments, the outer struts also include a rear outrigger 140 at a proximal end of the trace gimbal 100. In some embodiments, the rear outrigger 140 includes a proximal rear outrigger 144 and a distal rear outrigger 142. In some embodiments, a length direction of the trace gimbal 100 is defined as the direction extending from the proximal end and distal end of the trace gimbal 100.

In some embodiments, the distal rear outrigger 142 and the proximal rear outrigger 144 are defined by a bend or non-linear feature of the rear outrigger 140. In some embodiments, the rear outrigger 140 is a linear feature. In some embodiments, the distal rear outrigger 142 and the proximal rear outrigger 144 are non-distinguishable, and may be adjoined at a linear feature that does not physically separate the two features.

In some embodiments, the distal rear outrigger 142 includes a first cross-section and the proximal rear outrigger 144 includes a second cross-section larger than the first cross-section. In some embodiments, the first cross-section of the distal rear outrigger is between 0.01 mm and 0.10 mm. In some embodiments, the first cross-section of the distal rear outrigger is about the same as the first and second cross-sections of the front outrigger.

In some embodiments, the trace gimbal 100 also includes a middle strut 120 extending in a width direction of the trace gimbal 100 (essentially in a direction orthogonal to the length direction of the trace gimbal 100 for some embodiments) and connecting the front outrigger 110 to the rear outrigger 140. In other words, the front outrigger 110 and the rear outrigger 140 adjoin at the proximal end of the middle strut 120. In some embodiments, the front outrigger 110 and the middle strut 120 generally form approximately a C-shape or U-shape. In some embodiments, a cross-section of the middle strut 120 is between 0.01 mm and 0.10 mm. In some embodiments, the cross-section of the middle strut 120 is about the same as the first and second cross-sections of the front outrigger.

In some embodiments, the trace gimbal 100 also includes an inner strut 150 extending from the slider tongue 130 and connecting the middle strut 120 to the slider tongue 130. The inner strut 150 (as well as the middle strut 120) supports the slider tongue 130 onto which a read/write head is assembled. In some embodiments, the inner strut 150 includes a distal end 152 and a proximal end 154. In some embodiments, the distal end of the middle strut 120 connects to the distal end 152 of the inner strut 150 and the proximal end 154 of the inner strut 150 connects to the slider tongue 130. In some embodiments, the inner strut 150 generally extends from the distal end of the middle strut 120 toward a proximal end of the trace gimbal 100 to connect to the slider tongue 130.

In some embodiments, a width of a cross-section in a central portion of the inner strut 150 is larger than the width of the cross-sections of the proximal front outrigger 114, the distal front outrigger 112, and the middle strut 120. For some embodiments, the first cross-section and the second cross-section of the front outrigger is between 0.01 mm and 0.10 mm. In some embodiments, the first cross-section of the distal rear outrigger is between 0.01 mm and 0.10 mm. In some embodiments, a cross-section of the middle strut 120 is between 0.01 mm and 0.10 mm. For some embodiments, the width of the cross-section of the central portion of the inner strut is between 0.10 mm and 0.25 mm.

Without being bound to any particular theory, the gimbal torsion frequency can be related to the mass and stiffness of the gimbal configuration, e.g., the outrigger and middle and inner struts. A stiffer gimbal structure can provide a higher gimbal torsion frequency in general, but high stiffness is undesirable as it reduces the flexibility of the gimbal tongue to pitch and roll freely. The shorter and narrower front outrigger according to some embodiments of the present disclosure, in a section where there is more movement at the gimbal torsion frequencies, enables the gimbal torsion frequencies to be increased while the roll stiffness can be maintained. A more narrow width can lower the mass of the outrigger and help to increase the gimbal torsion frequencies. The more narrow width can also help to maintain the gimbal roll stiffness in a reasonable range. The middle strut connecting the outrigger can increase the rigidity of the gimbal, increase the gimbal torsion frequencies, and maintain the gimbal roll stiffness.

As shown in FIG. 2, a gimbal according to some embodiments of the present disclosure demonstrate improved gimbal torsional frequencies; specifically, the first gimbal torsion is 14.1 kilohertz ("kHz") (a 1.5 kHz increase relative to the gimbal torsion of present gimbal configurations), the second gimbal torsion is 17.0 kHz (a 1.5 kHz increase relative to the second gimbal torsion of present gimbal configurations), and the third gimbal torsion is 28.6 kHz (a 4.3 kHz increase relative to the third gimbal torsion of present gimbal configurations).

FIGS. 3A-C demonstrate exemplary mode shapes of the first gimbal torsion, second gimbal torsion, and third gimbal torsion.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:
1. A trace gimbal comprising:
outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger, wherein a length direction of the trace gimbal is defined as a direction extending from the proximal end to the distal end;
a middle strut extending in a width direction of the trace gimbal orthogonal to the length direction and extending towards a slider tongue, the middle strut including a first end adjoining the proximal front outrigger to the rear outrigger; and
an inner strut connecting the middle strut to the slider tongue such that a second end of the middle strut connects to the inner strut, the inner strut and the middle strut adjoin the outer struts to the slider tongue, wherein a width of a cross-section in a central portion of the inner strut is larger than the width of the cross-sections of the proximal front outrigger, the distal front outrigger, and the middle strut.

2. The trace gimbal of claim 1, comprising at least one microactuator mounted on the slider tongue, the inner strut supports the slider tongue.

3. The trace gimbal of claim 1, wherein the proximal front outrigger includes a first cross-section and distal front outrigger includes a second cross-section, and a width of the second cross-section width is about a same dimension as the first cross-section of the proximal front outrigger.

4. The trace gimbal of claim 3, wherein the first cross-section and the second cross-section of the front outrigger is between 0.01 millimeters and 0.10 millimeters.

5. The trace gimbal of claim 1, wherein the distal rear outrigger includes a first cross-section and the proximal rear outrigger includes a second cross-section larger than the first cross-section.

6. The trace gimbal of claim 5, wherein the first cross-section of the distal rear outrigger is between 0.01 millimeters and 0.10 millimeters.

7. The trace gimbal of claim 1, wherein the inner strut includes a distal end and a proximal end, the middle strut connects to the distal end of the inner strut, and the inner strut connects to the slider tongue.

8. The trace gimbal of claim 7, wherein the inner strut extends from middle strut toward a proximal end of the trace gimbal to connect to the slider tongue.

9. The trace gimbal of claim 1, wherein the front outrigger and the middle strut form a C-shape or a U-shape.

10. The trace gimbal of claim 1, wherein a cross section of the middle strut is the same as the first and second cross-sections of the front outrigger.

11. A suspension comprising:
a trace gimbal including outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger, wherein a length direction is defined as a direction extending from the proximal end to the distal end,
a middle strut extending in a width direction orthogonal to the length direction and towards a slider tongue, the middle strut including a first end adjoining the proximal front outrigger to the rear outrigger, and
an inner strut connecting the middle strut to the slider tongue such that a second end of the middle strut connects to the inner strut, the inner strut and the middle strut adjoin the outer struts to the slider tongue, wherein a width of a cross-section in a central portion of the inner strut is larger than the width of the cross-sections of the proximal front outrigger, the distal front outrigger, and the middle strut.

12. The suspension of claim 11, comprising at least one microactuator mounted on the slider tongue, wherein the inner strut supports the slider tongue.

13. The suspension of claim 11, wherein the proximal front outrigger includes a first cross-section and distal front outrigger includes a second cross-section, wherein a width of the second cross-section width is a same dimension as the first cross-section of the proximal front outrigger.

14. The suspension of claim 13, wherein the first cross-section and the second cross-section of the front outrigger is between 0.01 millimeters and 0.10 millimeters.

15. The suspension of claim 11, wherein the distal rear outrigger includes a first cross-section and the proximal rear outrigger includes a second cross-section larger than the first cross-section.

16. The suspension of claim 15, wherein the first cross-section of the distal rear outrigger is between 0.01 millimeters and 0.10 millimeters.

17. The suspension of claim 11, wherein the inner strut includes a distal end and a proximal end, the middle strut connects to the distal end of the inner strut, and the proximal end of the inner strut connects to the slider tongue.

18. The suspension of claim 17, wherein the inner strut extends from the middle strut toward a proximal end of the trace gimbal to connect to the slider tongue.

19. The suspension of claim 11, wherein the front outrigger and the middle strut form a C-shape or U-shape.

20. The suspension of claim 11, wherein a cross section of the middle strut is about the same as the first and second cross-sections of the front outrigger.

* * * * *